United States Patent [19]
Johnson et al.

[11] 3,975,256
[45] Aug. 17, 1976

[54] APPARATUS FOR TREATMENT OF AQUEOUS SEWAGE COMPOSITION

[75] Inventors: Theodore C. Johnson, Solon, Ohio; James D. Snodgrass, Darien, Ill.

[73] Assignee: Heds, Inc., Chagrin Falls, Ohio

[22] Filed: Feb. 22, 1973

[21] Appl. No.: 334,761

[52] U.S. Cl. .................................. 204/275; 4/10; 204/149
[51] Int. Cl.² ............................................ C02B 1/82
[58] Field of Search .......... 204/149, 130, 275, 152; 4/10

[56] References Cited
UNITED STATES PATENTS

| | | | |
|---|---|---|---|
| 1,080,826 | 12/1913 | Gibson | 204/152 |
| 1,095,893 | 5/1914 | Landreth | 204/149 |
| 1,146,942 | 7/1915 | Landreth | 204/149 |
| 1,831,076 | 11/1931 | Neeley | 204/152 |
| 3,060,118 | 10/1962 | Schoeffel | 210/3 |
| 3,126,333 | 3/1964 | Williams | 210/15 |
| 3,347,786 | 10/1967 | Baer et al. | 210/15 |
| 3,479,281 | 11/1969 | Kikindai et al. | 210/44 |
| 3,523,891 | 8/1970 | Mehl | 210/44 |
| 3,568,215 | 3/1971 | Riedel et al. | 4/10 |
| 3,766,045 | 10/1973 | Itakura et al. | 204/275 |

*Primary Examiner*—John H. Mack
*Assistant Examiner*—A. C. Prescott
*Attorney, Agent, or Firm*—McNenny, Pearne, Gordon, Gail, Dickinson & Schiller

[57] ABSTRACT

There is provided an improved apparatus and method for relatively low volume batch treatment and disposition of sewage or toilet wastes especially from passenger vehicles such as railway cabooses, motor houses, or other passenger-carrying vehicles. The apparatus is characterized by the ability to operate without moving parts for sterilizing, disintegrating, and discharging an aqueous sewage composition including human feces and includes an enclosed chamber having an inlet for the sewage composition at the top of the chamber, separate electrodes in the lower portion of the chamber, a standpipe having an inlet from the chamber and communicating with the upper portion of the chamber and discharging exteriorly of the chamber, and means for impressing a potential difference across the electrodes. The method is characterized by impressing a potential difference across the electrodes sufficient to effect electrolytic discharge of gas at at least one of the electrodes and impressing a current across the electrodes sufficient to cause ebullient roiling action in the composition to disintegrate the solid waste material and suspend the resulting particles in the roiling medium. This operation results in the formation of a solids-containing evolved head of lesser density above the aqueous sewage composition. The roiling action is continued whereby the head is continuously added to and expands for communication with and discharge through the standpipe.

8 Claims, 7 Drawing Figures

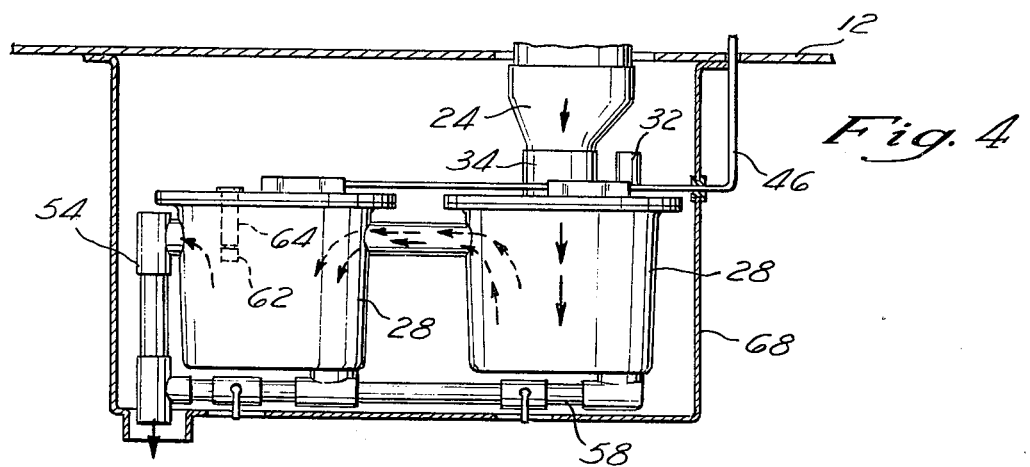
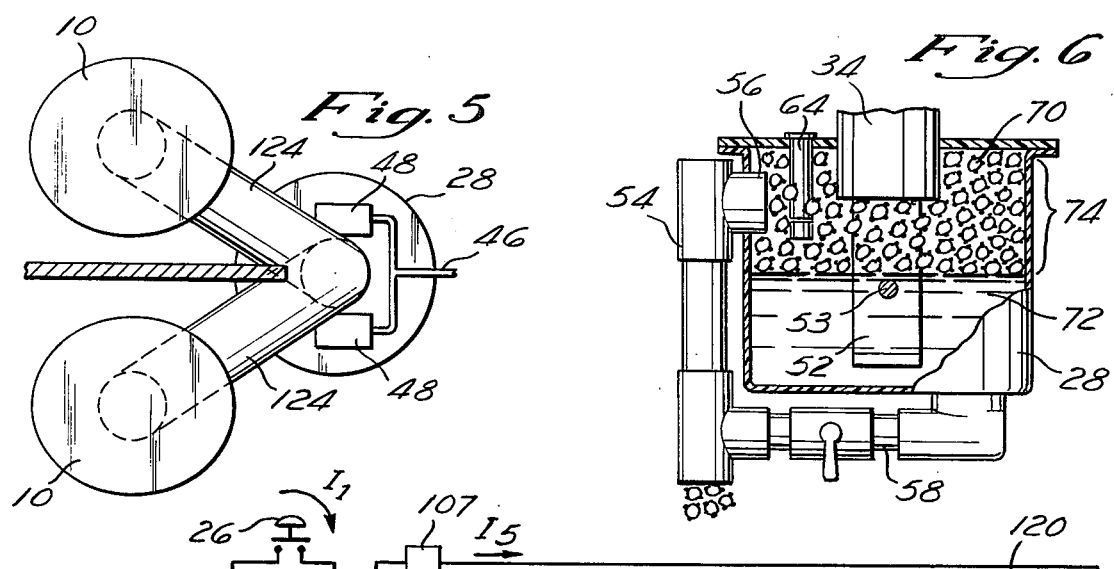
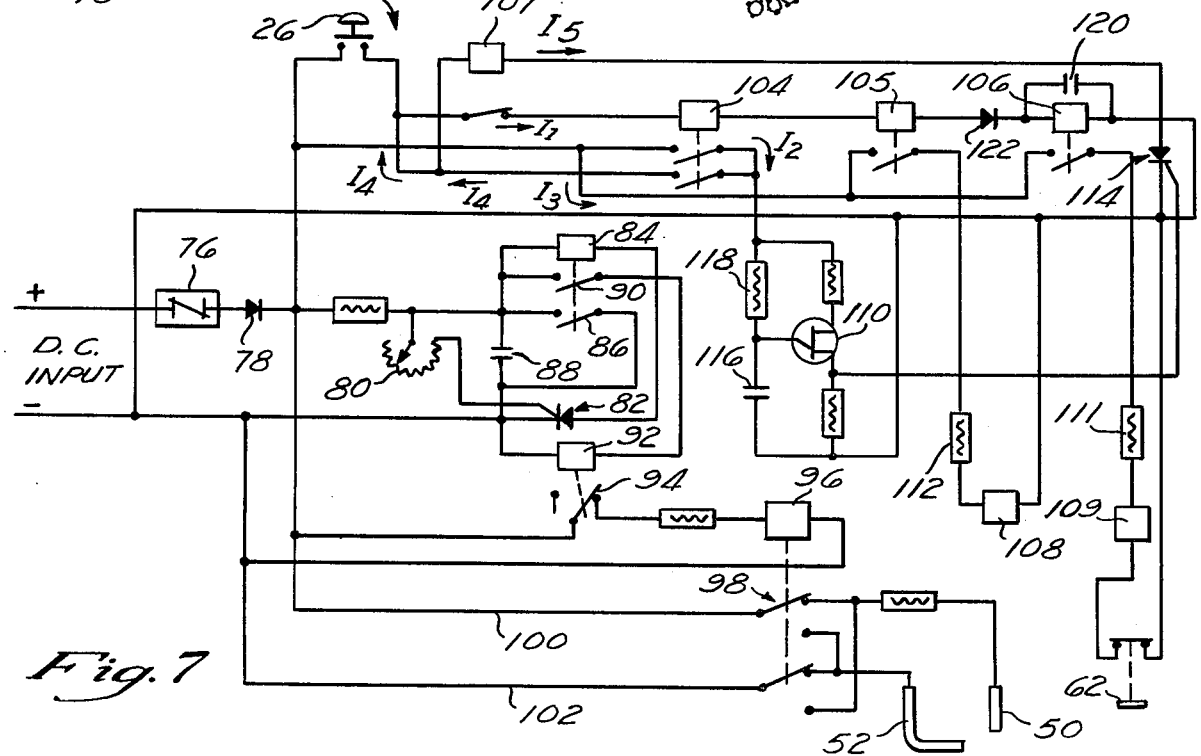

APPARATUS FOR TREATMENT OF AQUEOUS SEWAGE COMPOSITION

BACKGROUND OF THE INVENTION AND PRIOR ART

Environmental control activities have given rise to the need, particularly in connection with passenger-carrying vehicles, to provide for discharge only of pathogenically harmless toilet wastes from such vehicles. This is particularly true in the case of railway cars passing through relatively closely spaced built-up areas. Accordingly, the need for inexpensive thorough conditioning of such waste compositions is strongly felt.

Heretofore, devices have been produced in an effort to achieve these desired ends. While some of these have depended upon electrolytic treatment of the sewage composition, the devices themselves have either involved large-volume continuous flow installations or smaller complicated batch processors, characterized by moving parts which require maintenance, which are difficult to clean and repair, and which lessen reliability. (See U.S. Pat. No. 3,505,188 for an example of a prior art device relying on a mechanical skimmer.)

The present invention provides a very simple inexpensive apparatus readily adapted for use, especially in railroad cars. The apparatus is capable of operation without any moving parts, is easy to maintain, and reliable in its operation.

The effluent which is discharged from the apparatus and produced in accordance with the method of the present invention is sterile and inoffensive and may be discharged along a trackway even in built-up areas without encountering difficulties previously experienced.

BRIEF STATEMENT OF THE INVENTION

Briefly stated, the present invention is in the provision of means for disintegrating, sterilizing, and discharging on a batch basis, without mechanical agitators or skimmers or the like, an aqueous sewage composition including solid excrement, or waste material. The invention contemplates contacting or disposing the composition in ionic communication with spaced electrodes in a container which is defined by an enclosed chamber. The chamber is provided with an inlet for the sewage material, a standpipe discharge, and terminal means for impressing a potential difference across the electrodes. A potential difference is impressed across the electrodes which is sufficient to effect electrolytic discharge of gas at at least one of the electrodes. Simultaneously, current is impressed across the electrodes of sufficient magnitude to cause ebullient roiling action in the composition to disintegrate the solid waste material and to suspend the resultant particles in the roiling medium. This results in the formation of a solids-containing evolved head of lesser density — a suspension possibly colloidal) of fine solids in gas, or a foamy or bubbly gas-liquid-solids mix, or both — above the aqueous sewage composition. The roiling action is maintained to add to the evolved head whereby it continues to expand for discharging through the standpipe.

The apparatus which is capable of operation without moving parts includes an enclosed chamber having top, bottom, and sidewall members, an inlet for the aqueous sewage composition at the top of the chamber, separate electrodes in the lower portion of the chamber, and a standpipe having an inlet from the chamber and communicating with the upper portion of the chamber and discharging exteriorly of the chamber. Two or more chambers can be provided in series if desired.

BRIEF DESCRIPTION OF THE DRAWINGS

In the drawings.

FIG. 4 is a view on a smaller scale showing two of the chambers of FIGS. 2-3 connected for series operation.

FIG. 5 is a schematic view illustrating the manifolding of two toilets, for example from adjacent railroad sleeping car compartments, to a single treating chamber.

FIG. 6 is a view similar to that shown in FIG. 2 but on a reduced scale showing the apparatus in operation and the development of a solids-containing evolved head and its discharge through the standpipe.

FIG. 7 is a schematic diagram of an electric circuit used in the illustrated example of the invention.

DETAILED DESCRIPTION OF THE DRAWINGS

Figure 1:
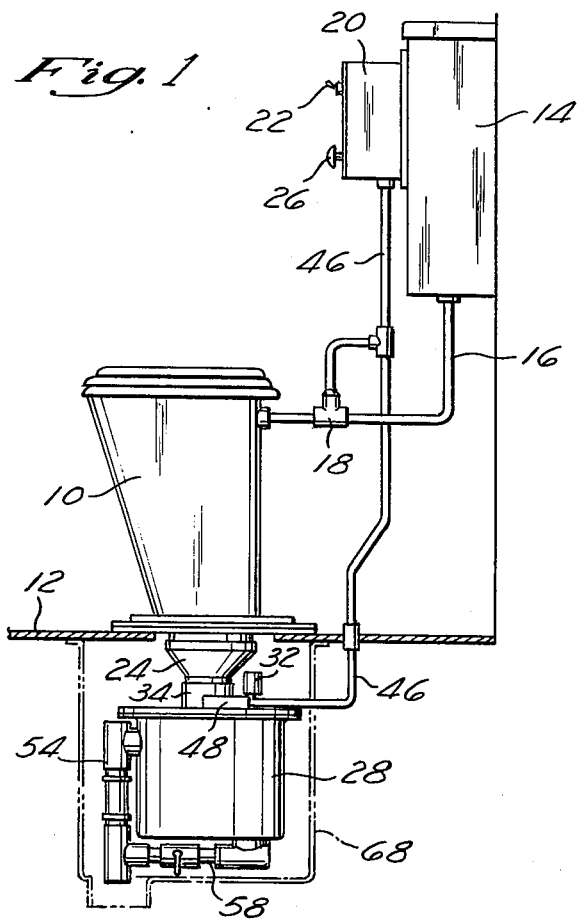
FIG. 1 shows a toilet installation in which the invention is employed.

In FIG. 1, a toilet 10 of conventional structure is mounted on a floor 12 which for purposes of the present description will be considered as a railroad car floor. A wall-mounted tank 14 is provided for containing water or an aqueous medium for supply to the toilet 10 through a valved conduit 16 including a normally closed solenoid valve 18. Electric controls for operating the apparatus are contained within the box 20. The power supply switch 22 is kept on at all times during normal operation of the device.

Figure 2:
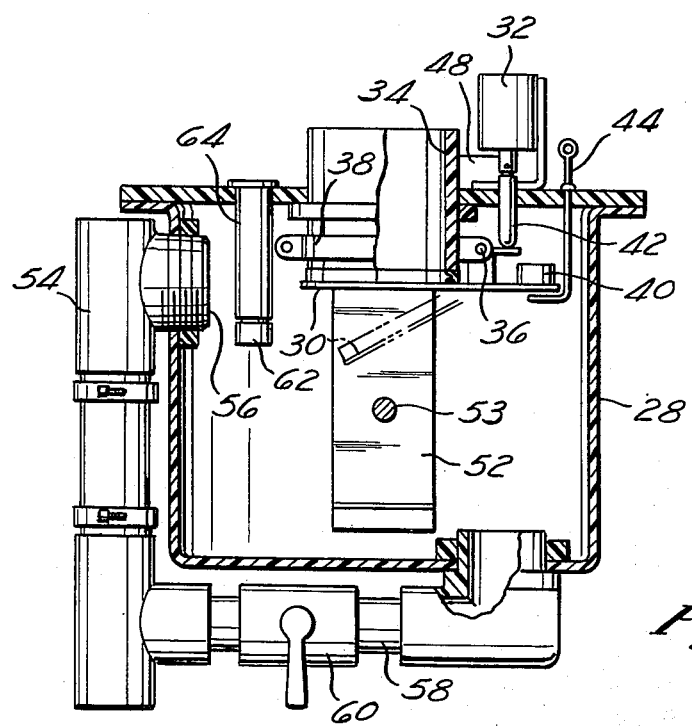
FIG. 2 is an enlarged partly cross-sectional side-elevational view of the treating chamber seen in the lower part of FIG. 1, together with certain associated elements.

Through an adapter 24 on which the toilet 10 is supported, aqueous sewage composition flushes from the toilet to the chamber 28 in response to the operation of the button switch 26 to initiate the flushing cycle. The toilet flushes into the treating chamber 28 by opening the solenoid valve 18 and the solenoid operated flap valve 30 (FIG. 2) which is controlled by the solenoid 32. The flap valve 30 makes a water-tight closure against the bottom of the inlet mouth 34 which in turn is sealed in fluid-tight relation around the bottom end of the adapter 24. The flap valve 30 is supported at a hinge 36 which in turn is supported on a bracket 38 clamped around the outside wall diameter of the inlet mouth 34. The flap valve is provided with a counterweight 40. The actuating rod 42 of the solenoid 32 is illustrated in FIG. 2 in its normal extended position. In this position it bears against the illustrated small flange which is fixed for movement with the flap valve 30 around the hinge 36. A spring (not shown) within the solenoid 32 biases the actuating rod 42 to this extended position and exerts several pounds of downward pressure on the flap valve assembly, whereby the flap valve is firmly seated upwardly against the bottom end of the inlet mouth 34.

When the solenoid 32 is energized, the bias of the spring is overcome and the actuating rod 42 rises allowing the flap valve 30 to open by overcoming the weight of the counterbalance 40.

A pull-wire 44 extends through the top of the chamber 28 to a point just below the counterweighted end of the flap valve 30. This pull-wire is not used in the normal operation of the device, but enables the flap valve to be opened without power when necessary.

A cable 46 for power leads and control leads extends from the box 20. Power leads are attached to the electrode terminals 46 (FIG. 3) which are protected by the cover plates 48. The electrodes 50 and 52 hang from the top wall of the chamber 28 into the bottom portion of the chamber. The electrode 50 terminates well short of the bottom wall of the chamber, while the other electrode 52 extends almost to the bottom wall and horizontally along the bottom wall for a distance. A dielectric spacer bar 53 holds the bottom portions of the electrodes in spaced relation.

A standpipe 54 has an inlet 56 opening from the top portion of the chamber 28. A drain line 58 opens from the bottom portion of the chamber 28 and is normally closed by a manually operated valve 60 at all times during normal operation of the device. The drain line 58 may open into the lower discharge end of the standpipe 54 as shown. The standpipe 54 and drain line 58 may be made up of interconnected pipe segments as shown.

A hanging float 62 is adapted to be activated by a rising liquid level within the chamber 28 to thereby open a normally closed switch contained within the switch housing 64 which extends downwardly through the top of the chamber 28.

The chamber 28 may be cylindrical in shape and may be formed of suitable dielectric materials such as glass fiber reinforced resinous material, for example glass fiber reinforced epoxy resin.

A protective surrounding housing 68 for the entire under-floor assembly may be provided as indicated in phantom view in FIG. 1.

FIG. 7 is a schematic diagram of the electrical control circuit. Most of the illustrated electrical elements are located in the box 20 but some, such as the solenoid valve 18 or the solenoid 32, are not.

The circuit shown is protected by a circuit breaker 76 and includes an electrode polarity control and timing portion whose period of operation may be adjusted by means of the variable resistor 80 to control the total time necessary for the SCR 82 to reach breakover voltage and fire as the capacitor 88 charges, after which the relay 84 operates to close switch 86, the SCR 82 falls below its holding current upon discharge of the capacitor 88, the relay 84 opens, and the cycle repeats. The period of the cycle may be in the order of a major fraction of a minute.

Operation of the relay 84 also opens and closes a switch 90 which controls power to a stepping relay 92. The advance of the associated stepping switch 94 alternately activates and deactivates relay 96 to alternately reverse the double throw double pole switch 98 and in turn reverse the power connection via power lines 100 and 102 to the electrodes 50 and 52 to thereby conserve the electrodes.

The circuit shown also includes a flush control and timing portion.

The flush cycle begins with the momentary contact of the push switch or button switch 26, which allows current to flow from rectifier 78 through the switch and subsequently through the normally closed contacts of relay 107 to the coils of relays 104, 105, and 106. The current $I_1$ flowing through these relay coils causes them to close their respective normally open contacts. The closing of the contacts of relay 104 produces three results. The timer that includes UJT 110 begins its cycle as it is supplied with current $I_2$, power $I_3$ is supplied to the closed contacts of relays 105 and 106, and power $I_4$ is supplied to the current path of $I_1$, locking relays 104, 105, and 106 closed even after switch 26 is released. The closing of relay 105 energizes relay 108 through a current limiter 112 and activates the flap valve 30 to dump the contents of the bowl into the holding tank. At the same time the flap valve is dumping, relay 109 is energized through the closed contacts of relay 106 and current limiter 111 to provide water for the flushing action during the timing cycle. Float 62 breaks the circuit to the flush water valve relay 109 if the liquid content of the holding tank is exceedingly high.

The timing of the cycle is controlled by SCR 114, which is triggered by UJT 110. The UJT timer 110 provides a pulse to the gate of SCR 114 when the voltage of capacitor 116 reaches a certain level. The time the capacitor takes to reach this level is determined by the RC time constant of resistor 118 and capacitor 116. When UJT timer 110 pulses, the capacitor 116 is reset to zero and SCR 114 begins to conduct energizing relay 107 by current $I_5$. The current through the coil of relay 107 opens its normally closed contacts, breaking the $I_1$ current path and causing relays 104, 105, and 106 to open their contacts. The opening of the contacts of relay 104 breaks the current $I_4$, $I_5$ supplying relay 107 and the SCR 114 thereby turning off SCR 114 and resetting the contacts of relay 107 to their normally closed position. Relay 106 remains closed momentarily after relay 105 opens, since it must dissipate the energy stored in the capacitor 120. This allows the water to remain on after the flapper closes to partly fill the inlet mouth 34 and adapter 24 and to provide a water seal and prevent gases from escaping from the treating tank 28. The diode 122 prevents the energy stored in capacitor 120 and the coil of relay 106 from being dissipated by any of the other coils in the circuit, or from arcing across the relay contacts of relay 107 when they open.

The above circuit description is provided merely by way of illustration of one control arrangement. It may be replaced by other control arrangements, for example by solid state elements or integrated circuit components.

Electromotive force of sufficient intensity to cause the generation of gas is provided to the aqueous sewage composition through the electrodes 50 and 52 which may be formed of copper or any other electrode material resistant to an aqueous sewage composition. The aqueous sewage composition when disposed in contact with and between the electrodes 50 and 52 provides through inclusion of soluble salt materials normally occurring in human waste an ion containing and conducting medium through which an electric current may be carried ionically. In order to effect electrolysis of water, a voltage is impressed across the terminals 46 which exceeds the gas overvoltage at the surface of the electrode in the electrolytic medium. In automotive vehicles, for example, 6, 12 or 24 volts DC is a normal available voltage and such voltages up to voltages of the order of 220 volts AC (rectified to DC) may be used and any voltage may be used which has sufficient magnitude to cause definite and continuous evolution of gas at the electrode. The attainment of gas overvoltage values may be determined simply by visual observation of continuous and vigorous gas evolution within the liquid bath in the chamber 28.

In operation, when the push switch 26 is operated the flap valve 30 and the solenoid operated valve 18 both open and the toilet flushes for a timed interval, the flap valve 30 then recloses shortly before reclosing of the solenoid operated valve 18 so that some water is held above the flap valve 30 in the inlet mouth 34 and adapter 24. The water and waste discharged by the flushing are received in the treating chamber 28. Waste treatment continuously occurs in the chamber 28 so long as the liquid level is above the bottom of the electrode 50 and below the level where it will actuate the float 62. If the liquid is below the level of the electrode 50, electrolytic action stops until succeeding flushings of the toilet raise the level of the liquid in the chamber 28 sufficiently to again establish contact with the electrode 50. If the liquid level rises so high as to activate the float 62, operation of the solenoid operated flush valve 18 is prevented until the waste treatment process in the chamber 28 lowers the liquid sufficiently to deactivate the float 62. Approximately 8 flushes are required to fill the chamber 28, and the device has a capacity of approximately 15 flushes per hour for continuous operation.

For proper operation, the current impressed across the electrodes must be of sufficient magnitude to cause an ebullient roiling action in the ion containing and conducting medium. Generally a current of the order of 10 amps is sufficient for this purpose. Such roiling results in disintegration of solid matter, including toilet paper, and creates a solids-containing gaseous or bubbly evolved head of relatively low density as illustrated in FIG. 6. The low density head 70 forms above the aqueous sewage containing medium or bath 72. Continued application of the voltage and current causes additions to the evolved head 70 whereby it is compressed in the ullage space 74 of the chamber 28. The only escape route is through the inlet 56 of the standpipe 54. The roiled and foamed material including subdivided particulate solid matter is expressed downwardly through the standpipe 54 and from the discharge end thereof for ultimate discharge from the vehicle or storage in a suitable vessel.

When the liquid level within chamber 28 falls below the level of the bottom of the electrode 50, electric contact is broken. This effects shutdown of electrolysis and roiling action until additional aqueous sewage composition is flushed into the chamber 28.

As previously described, the lower portion of the electrode 52 extends across the bottom wall of the chamber 28. During operation an ebullient roiling action occurs at numerous locations on the surfaces and edges of this lower electrode portion, thereby increasing circulation of the wholly or partly broken up solids in the sewage bath.

The apparatus of the present invention operates quite satisfactorily on a current density of approximately 500 milliamps per square centimeter, consuming approximately 750 watts of power in a volume of approximately 170 cubic inches. As is well known, passing a current through an electrolyte or ion-containing and conducting medium must result in electrochemical reactions occurring at each of the electrodes. Simply stated, the cathode supplies electrons at the electrode/electrolyte interface to the positively charged ions which are thereby reduced. Likewise, the anode accepts electrons in an equal number from the ions which are thereupon oxidized at the electrode/electrolyte interface. In the waste materials being treated, a large variety of ionizable chemical species exists productive of ions which may be oxidized or reduced, depending upon their respective polarities. Many complex organic compounds are also present. Iron salts, sodium chloride, etc., are examples of materials productive of ions reactive at the electrodes. As indicated, the preferred electrode material is copper. The aqueous medium contains sodium and chlorine ions resulting from sodium chloride contained in human excreta. When the current is flowing in one direction, copper goes into solution at the anode to form the cupric ion and yield two electrons. Iron is oxidized from ferrous to ferric, also yielding an electron. Chlorine may be oxidized to the gaseous state and be evolved as well as hydrogen. Water is electrolyzed to hydrogen and oxygen at the corresponding electrodes. At the opposite electrode, copper may be reduced from solution to the metal and the reverse reactions for iron and chlorine may also occur at the electrode.

As shown in FIG. 4, two treating chambers may be connected in series with the second chamber functioning as a combined standpipe and secondary treating chamber with respect to the first chamber, and the second chamber being provided with the ultimately discharging standpipe as indicated. The hanging float 62 and switch housing 64 are provided only in association with the second chamber 28. Drain lines similar to the drain line 58 are provided. The electrode terminals associated with the chambers 28 are connected in parallel to the power lines which extend through the cable 46.

The first chamber 28 operates as previously described until it is filled with liquid discharge. During normal operation, the evolved head simply passes into the second chamber 28 and passes on through the discharge standpipe 54. However there is no float 62 in the first chamber, and as the first chamber becomes filled with the liquid bath, overflowing occurs into the second chamber 28. As soon as the electrode 50 associated with this chamber is in contact with the second liquid bath both chambers are treating the liquid bath and contributing to the evolved head. The toilet may continue to be flushed until the bath reaches the hanging float 62 associated with the second chamber 28.

Figure 3:
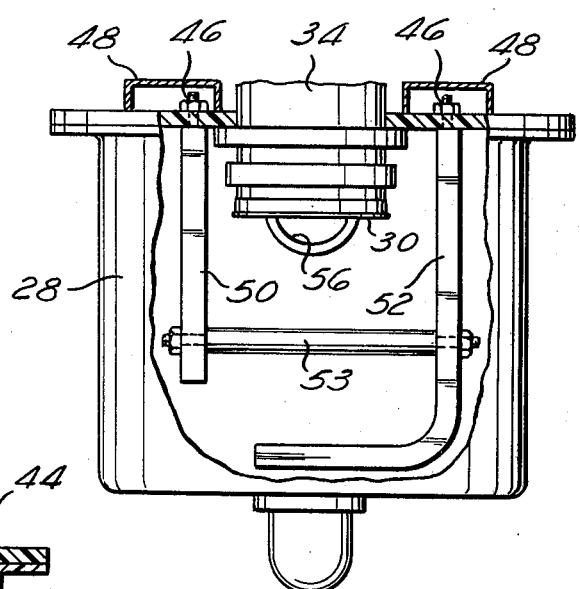
FIG. 3 is a partly broken away end-elevational view of the same apparatus as viewed from the right hand side of FIG. 2.

As previously stated, approximately 15 to 17 flushes are required to fill the single chamber device shown in FIGS. 1–3. Approximately double this number of flushes will fill the two-chambered device shown in FIG. 4. While the single-chambered device has a capacity of 15 flushes per hour for continuous operation, the double-chambered device has a capacity of approximately 30 flushes per hour for continuous operation.

Again, a protective housing 68 is shown associated with the underfloor assembly indicated in FIG. 4.

More than two chambers 28 may be provided. The additional chambers (not shown) are interposed in a line of flow between the illustrated chambers. Each of the additional chambers receives liquid overflow and/or the solids-containing evolved head of lower density from the preceding chamber and each discharges to a succeeding chamber.

FIG. 5 simply illustrates manifolding of two toilets 10 to a single treating chamber 28 by suitble manifolding 124. This may be particularly suitable for railway sleeping cars where a number of low capacity toilets are required.

The invention is not restricted to the slavish imitation of each and every one of the details described above which have been set forth merely by way of example with the intent of most clearly setting forth the teaching of the invention. Obviously devices may be provided which change, eliminate or add certain specific structural details without departing from the invention.

We claim:

1. Apparatus capable of waste-treating operation, without waste-agitating, waste-spreading, waste-stirring, waste-shaking, waste-distributing, waste-separating, waste-propelling, waste-mixing, waste-conveying, or other waste-manipulating mechanical moving parts, for sterilizing, disintegrating, and discharging an aqueous sewage composition comprising:
  a. an enclosed chamber having top, bottom, and sidewall members for receiving aqueous sewage composition in its lower portions to thereby define an ullage space in its upper portions, the chamber being empty of mechanical moving parts for waste treatment,
  b. a substantially gas-tight valved inlet for the aqueous sewage composition opening into the top of the ullage space,
  c. at least two electrodes of unlike polarity extending into a treatment space at the lower sewage-receiving portions of the chamber below the ullage space,
  d. power-receiving and control means for imposing on the electrodes a potential difference sufficient to effect electrolytic discharge of gas at at least one of the electrodes and a current across said electrodes sufficient to cause ebullient roiling action in said composition, to thereby generate a solids-containing evolved head of lesser density above the aqueous sewage composition,
  e. an outlet opening from the top of the ullage space and connecting through conduit means to a discharge end, said outlet being open to passage of said solids-containing evolved head from said ullage space.

2. Apparatus as in claim 1 including level control means for preventing flushing of waste composition through the inlet into the chamber when the liquid level within the chamber approaches the height of the outlet.

3. Apparatus as in claim 1 in which at least one of the electrodes extends across the bottom wall of the chamber in closely spaced relation therewith.

4. Apparatus as in claim 1 in which at least one of the electrodes terminates above, and in spaced relationship to, the bottom wall of the chamber to define the level at which electrolytic action within the chamber will be interrupted by breaking the current between the electrodes when the liquid level within the chamber falls to a certain value.

5. Apparatus as in claim 1 in which the recited chamber is supplemented by a second similar chamber having an inlet connected to the outlet of the first recited chamber, the second chamber having its own electrodes governed by said power receiving and control means, whereby both chambers treat the sewage when the first chamber overflows into the second chamber sufficiently so that the liquid level in the second chamber establishes a current path between the electrodes therein.

6. Apparatus as in claim 1, the recited chamber being supplemented by a second similar chamber having an inlet connected to the outlet of a preceding chamber, the second chamber having its own electrodes governed by said power-receiving and control means, additional chambers interposed between the first and second chambers, each chamber subsequent to the first receiving liquid overflow and/or solids-containing evolved head of lower density from the preceding chamber and each chamber but said second chamber discharging to the next succeeding chamber.

7. Apparatus as in claim 1, the recited chamber being supplemented by a second similar chamber having an inlet connected to the outlet of the first chamber, the second chamber having its own electrodes governed by said power-receiving and control means, level control means for preventing flushing of waste composition into the inlet of the first chamber when the liquid level within the second chamber approaches the height of the outlet of the second chamber, whereby both chambers treat the sewage when the first chamber overflows into the second chamber sufficiently so that the liquid level in the second chamber establishes a current path between the electrodes therein.

8. Apparatus as in claim 1, the recited chamber being supplemented by a second similar chamber having an inlet connected to the outlet of a preceding chamber, the second chamber having its own electrodes governed by said power-receiving and control means, one or more additional chambers interposed between the first and second chambers, each chamber subsequent to the first having its own electrodes governed by said power-receiving and control means and receiving liquid overflow and/or solids-containing evolved head of lower density from the preceding chamber and each chamber but said second chamber discharging to a succeeding chamber, level control means for preventing flushing of waste composition into the inlet of the first chamber when the liquid level within the second chamber approaches the height of the outlet of the second chamber, whereby any given chamber after the first chamber commences to treat the sewage when the next-preceding chamber overflows into said given chamber sufficiently so that the liquid level in said given chamber establishes a current path between the electrodes therein.

* * * * *